Patented Nov. 23, 1948

2,454,274

UNITED STATES PATENT OFFICE 2,454,274

MANUFACTURE OF MIXED ESTERS OF GLYCOLS

Arthur John Daly and William Geoffrey Lowe, Spondon, near Derby, England, assignors to Celanese Corporation of America, a corporation of Delaware No Drawing. Application June 19, 1946, Serial No. 677,923. In Great Britain June 25, 1945

2 Claims. (Cl. 260—476)

This invention relates to the manufacture of certain novel mixed esters of glycols and to their use as plasticisers.

The new compounds are mixed esters of glycols with an aliphatic acid and an aromatic acid, and are hereinafter referred to as "mixed aliphatic-aromatic esters of glycols." The term "glycol" is used to denote an acyclic compound containing two alcoholic hydroxyl groups, the term "aliphatic acid" to denote carboxylic acids containing no aromatic ring structure in the molecule, and the term "aromatic acid" to denote carboxylic acids containing at least one aromatic ring structure, whether or not the carboxyl group is attached directly to the ring.

The glycol component of the new esters may be an alkylene glycol, e. g. ethylene glycol, propylene glycol, butylene glycol or trimethylene glycol, or it may contain, besides the two hydroxyl groups, one or more ether oxygen atoms. For example it may be a poly-alkylene glycol, e. g. di-ethylene glycol or tri-ethylene glycol, or an alkoxy or alkoxy-alkyl derivative of an alkylene or poly-alkylene glycol, e. g. methoxy-propylene glycol (glycerol mono-methyl ether).

The aliphatic acid component is preferably acetic acid, but it may for instance be another fatty acid, especially a lower fatty acid such as propionic or butyric acid. The aromatic acid component is preferably benzoic acid, but it may be another mono-nuclear aromatic acid, especially an alkyl-benzoic acid, e. g. a methyl or ethyl-benzoic acid; a halogen-substituted benzoic acid or alkyl-benzoic acid, e. g. a chlorbenzoic acid; or an aromatically substituted lower fatty acid, for example phenyl-acetic acid. Ethylene glycol acetate benzoate and diethylene glycol acetate benzoate are two of the new esters which have proved particularly valuable.

In one method of making the new esters, a partial ester of the glycol with one of the selected acids may be further esterified with the other by means of the free acid, the acid anhydride, the acid chloride or another esterifying derivative of the acid. For example, to obtain ethylene glycol acetate benzoate, ethylene glycol mono-acetate may first be prepared by one of the known methods, and then converted into the acetate benzoate by esterification by means of benzoic acid itself or a suitable derivative thereof, e. g. benzoyl chloride. Thus ethylene glycol may be heated under reflux with only sufficient acetic acid to form the mono-acetate, preferably in the presence of a suitable catalyst such as copper sulphate, and the product heated with benzoic acid in the presence of an acid catalyst, e. g. hydrogen chloride, or treated with benzoyl chloride in the presence of a base, e. g. pyridine or sodium hydroxide. Alternatively the mono-benzoate may first be made, for example by heating ethylene chlorhydrin with sodium benzoate, and may then be acetylated by means of acetic acid, acetic anhydride or acetyl chloride. The ethylene glycol acetate benzoate may be purified by fractional distillation under reduced pressure.

Another method consists in heating the ester of a glycol halogen-hydrin, especially a glycol chlor-hydrin, and one of the desired esterifying acids with the other desired esterifying acid or, preferably, a salt thereof. For example, beta-chlorethyl benzoate (ethylene glycol chlor-hydrin benzoate) may be made by passing ethylene oxide into benzoyl chloride containing a very small proportion of aluminum chloride and kept at a temperature of about 40°–70° C.; by heating the beta-chlorethyl benzoate with sodium or potassium acetate and optionally acetic acid, good yields of ethylene glycol acetate benzoate can readily be obtained.

In yet another method of making the new esters a diester of the glycol and one of the desired esterifying acids, is subjected to treatment whereby part of the acid radicle which it contains is replaced by the radicle of the other acid. Thus the glycol may first be fully esterified with the more volatile of the acids, and this ester then heated with the less volatile of the acids until half of its content of the radicle of the more volatile acid has been replaced by that of the less volatile.

The diester of the glycol with the more volatile acid may be made, for example, by heating the glycol with the acid or its anhydride under a reflux condenser, preferably in the presence of an esterification catalyst, for example sulphuric acid or copper sulphate. Other methods may, however, be adopted; for instance in place of the glycol an epoxide thereof may be used; thus ethylene glycol diacetate may be made by leading ethylene oxide into hot acetic anhydride containing as catalyst a small amount of aluminum chloride. The di-acetate or other di-ester may be purified by fractional distillation under reduced pressure.

To replace part of the more volatile acid in the ester by the less volatile, the diester is heated with the less volatile acid or with a suitable derivative thereof. For example, a mixture of a glycol di-acetate and benzoic acid may be heated to a fairly high temperature, preferably to 220°–300° C., in the presence or absence of an acid catalyst. It is advantageous to employ the acetate in considerable excess; thus for each mol (molecular proportion) of benzoic acid the mixture may contain 1.5 to 2.5 mols of the acetate. Thus ethylene glycol acetate benzoate may be made for example by heating two mols of ethylene glycol di-acetate with one mol of benzoic acid to 220–240° C., preferably in the presence of a small proportion of an acid dehydrating catalyst, e. g. toluene sulphonic acid or phosphoric acid.

It has been found preferable to carry out this reaction in a still from which the vapours produced can be at once removed without passing through a column of any kind. It is usually found that the distillate contains, besides the acetic or other more volatile acid liberated in the reaction, a certain amount of one or both of the reactants. Although by the use of a column it is possible to obtain a distillate substantially free from both reactants, the yield of the desired mixed ester is not then so favourable.

It has also been found that the presence of such metals as iron, stainless steel and copper reduces the yield of the mixed ester, and it is therefore advantageous to carry out the replacement in a still lined with or made of glass or coated with enamel.

The invention is illustrated by the following examples:

Example I

Acetic anhydride containing about 0.7% of its weight of aluminium chloride is introduced into a pressure-resisting copper still, the air is withdrawn from the still, and the acetic anhydride is heated to 140°–160° C. Ethylene oxide is then introduced into the still below the surface of the acetic anhydride at such a rate that the temperature is kept at about 160° C. by the heat of reaction, the pressure of ethylene oxide in the vessel rising to 20 lbs./sq. inch towards the end of the reaction. The ethylene oxide can be introduced more rapidly, and the reaction completed in a shorter time, if the still is provided with some form of cooling means. When the reaction is complete acetic acid is removed from the still by distillation under reduced pressure, leaving a residue comprising ethylene glycol di-acetate in almost theoretical yield.

The ethylene glycol di-acetate is then heated to 220–240° C. with half the equivalent quantity of benzoic acid (two mols of glycol di-acetate to one mol of benzoic acid) and with 0.5 to 1% of its weight of toluene sulphonic acid or phosphoric acid, in a glass-lined still without a column. Acetic acid and a certain amount of ethylene glycol di-acetate distil off as the reaction proceeds. When the reaction is substantially complete the ethylene glycol acetate benzoate produced is purified by fractional distillation under reduced pressure. If it is desired to obtain a product of a very low degree of acidity, (as in the case for example when the ethylene glycol acetate benzoate is to be used as a plasticiser for cellulose acetate) it may, after being purified by distillation, be thoroughly washed first with a solution of sodium carbonate and then with water, and finally dried in a current of air under reduced pressure at 60° C. The yield of purified ester is about 70%, calculated either on the ethylene glycol di-acetate or the benzoic acid. Ethylene glycol acetate benzoate is a colourless odourless liquid boiling at 155° C. under 12 mm. pressure.

The acetate benzoate of diethylene glycol can be made by a similar method. It is colourless, odourless liquid of boiling point 190°–196° C. under 30 mm. pressure. The acetate benzoate of triethylene glycol can also be made, and has similar properties.

Example II

Ethylene glycol acetate benzoate is also made by the following process starting from benzoyl chloride.

Benzoyl chloride containing about 0.02% of aluminium chloride is heated to 50°–60° C. in a mild steel vessel provided with a stirrer. Ethylene oxide is fed near the bottom of the vessel at as high a rate as possible without causing the temperature to exceed 60° C., until as much ethylene oxide has been fed as is chemically equivalent to the benzoyl chloride. The flow of ethylene oxide is then stopped, a small amount of sodium acetate is added to neutralise any acids that may have formed in the course of the reaction, and the products are fractionally distilled under 40 mm. pressure. The fraction coming over at 155°–170° C. consists essentially of beta-chlorethyl benzoate.

The beta-chlorethyl benzoate is then heated in a glass-lined vessel with an equimolecular amount of sodium acetate (previously dried at 300° C.) while stirring continuously, the temperature of the mixture being maintained throughout the process between 150° and 180° C. After about 10 hours the products are allowed to cool, and are filtered to remove the sodium chloride formed in the reaction. The residue on the filter is washed with acetic acid, and the washings added to the filtrate. The filtrate is then submitted to fractional distillation, first under atmospheric pressure to remove the acetic acid, and then under a pressure of about 20 mm. A small amount of ethylene glycol dibenzoate remains in the still. The overall yield of ethylene glycol acetate benzoate from the benzoyl chloride is about 60%.

The new esters are valuable plasticizers, especially for organic esters and ethers of cellulose, e. g. celluulose acetate (including cellulose acetate of high acetyl content), cellulose propionate, cellulose acetate-stearate, cellulose acetate butyrate, and ethyl celluloses which are soluble in organic solvents. The esters possess good solvent power for these cellulose derivatives, good heat stability and low solubility in water. They are also useful as plasticizers for other polymeric substances, for example polyvinyl esters.

The use of the new esters as plasticizers is illustrated by the following example.

Example III

Films having a basis of cellulose acetate and containing as plasticiser ethylene glycol acetate benzoate, diethylene glycol acetate benzoate or (for comparison) dimethyl phthalate were made as follows:

5 parts by weight of cellulose acetate and 1 part of plasticiser were dissolved in 14 parts of acetone and 5 parts of ethyl acetate, and the solutions cast to give a film 0.005 inch thick. The films were seasoned for 48 hours at room temperature followed by 8 hours at 40° C.

They were then tested for tensile strength and elongation at break. The strength of the film plasticised with ethylene glycol acetate benzoate was greater than that of the film plasticised with diethylene glycol acetate benzoate, which in turn was greater than that of the film plasticised with dimethyl phthalate; and elongation at break was about the same in each case. On immersion in water for 24 hours the film plasticised with ethylene glycol acetate benzoate increased in length slightly more than that plasticised with dimethyl phthalate, while the film plasticised with diethylene glycol acetate benzoate increased in length less than half as much as that plasticised with dimethyl phthalate.

Having described our invention, what we desire to secure by Letters Patent is:

1. Process for the manufacture of mixed esters of glycols having plasticising properties, which comprises heating a diester of a fatty acid containing 2 to 4 carbon atoms and a substance selected from the group which consists of alkylene and polyalkylene glycols together with an aromatic acid containing a benzene ring as the sole aromatic residue and continuously removing substantially the whole of the vapors produced.

2. Process for the manufacture of a glycol acetate benzoate, which comprises heating the diacetate of a substance selected from the group which consists of ethylene and polyethylene glycols with benzoic acid and continuously removing substantially the whole of the vapours produced.

ARTHUR JOHN DALY.
WILLIAM GEOFFREY LOWE.

REFERENCES CITED

The following references are of record in the file of this patent:

UNITED STATES PATENTS

| Number | Name | Date |
|---|---|---|
| 1,393,191 | Altwegg et al. | Oct. 11, 1921 |
| 1,810,318 | Loehr | June 16, 1931 |
| 2,151,185 | Carruthers et al. | Mar. 21, 1939 |
| 2,162,451 | De Ropp | June 13, 1939 |
| 2,198,665 | Gloor | Apr. 30, 1940 |

FOREIGN PATENTS

| Number | Country | Date |
|---|---|---|
| 8,012 | Great Britain (1911) | Jan. 4, 1912 |